United States Patent

[11] 3,551,687

| | | |
|---|---|---|
| [72] | Inventor | Egon Frey<br>Stuttgart-Degerloch, Germany |
| [21] | Appl. No. | 714,902 |
| [22] | Filed | Mar. 21, 1968 |
| [45] | Patented | Dec. 29, 1970 |
| [73] | Assignee | Daimler-Benz Aktiengesellschaft<br>Stuttgart-Unterturkheim, Germany |
| [32] | Priority | Mar. 21, 1967 |
| [33] | | Germany |
| [31] | | No. D52585 |

[54] ELECTRIC INSTALLATION FOR THE ACTUATING SWITCHES OF ELECTRICALLY OPERATED WINDOWS IN MOTOR VEHICLES
8 Claims, 1 Drawing Fig.

[52] U.S. Cl. .................................................. 307/10;
180/114
[51] Int. Cl. .................................................. B60r 25/00
[50] Field of Search ........................................... 180/111,
112, 113, 114, 49, (Inquired); 307/10, 38; 318/65,
103, 483

[56] References Cited
UNITED STATES PATENTS

| | | | |
|---|---|---|---|
| 2,576,816 | 11/1951 | Wahlberg ..................... | 180/112 |
| 3,089,729 | 5/1963 | Kumai ......................... | 180/112X |
| 3,135,545 | 6/1964 | Abrams ....................... | 180/112X |
| 3,339,665 | 9/1967 | Johnstone et al. ............ | 180/113 |

Primary Examiner—Robert K. Schaefer
Assistant Examiner—T. B. Joike
Attorney—Craig, Antonelli, Stewart & Hill ABSTRACT: A current supply installation for the actuating switches of electrically operated window lifts in motor vehicles in which voltage can be selectively applied to the actuating switches either by means of the ignition switch or by means of an auxiliary switch that is operated in the manner of a door-closure switch.

INVENTOR
EGON FREY

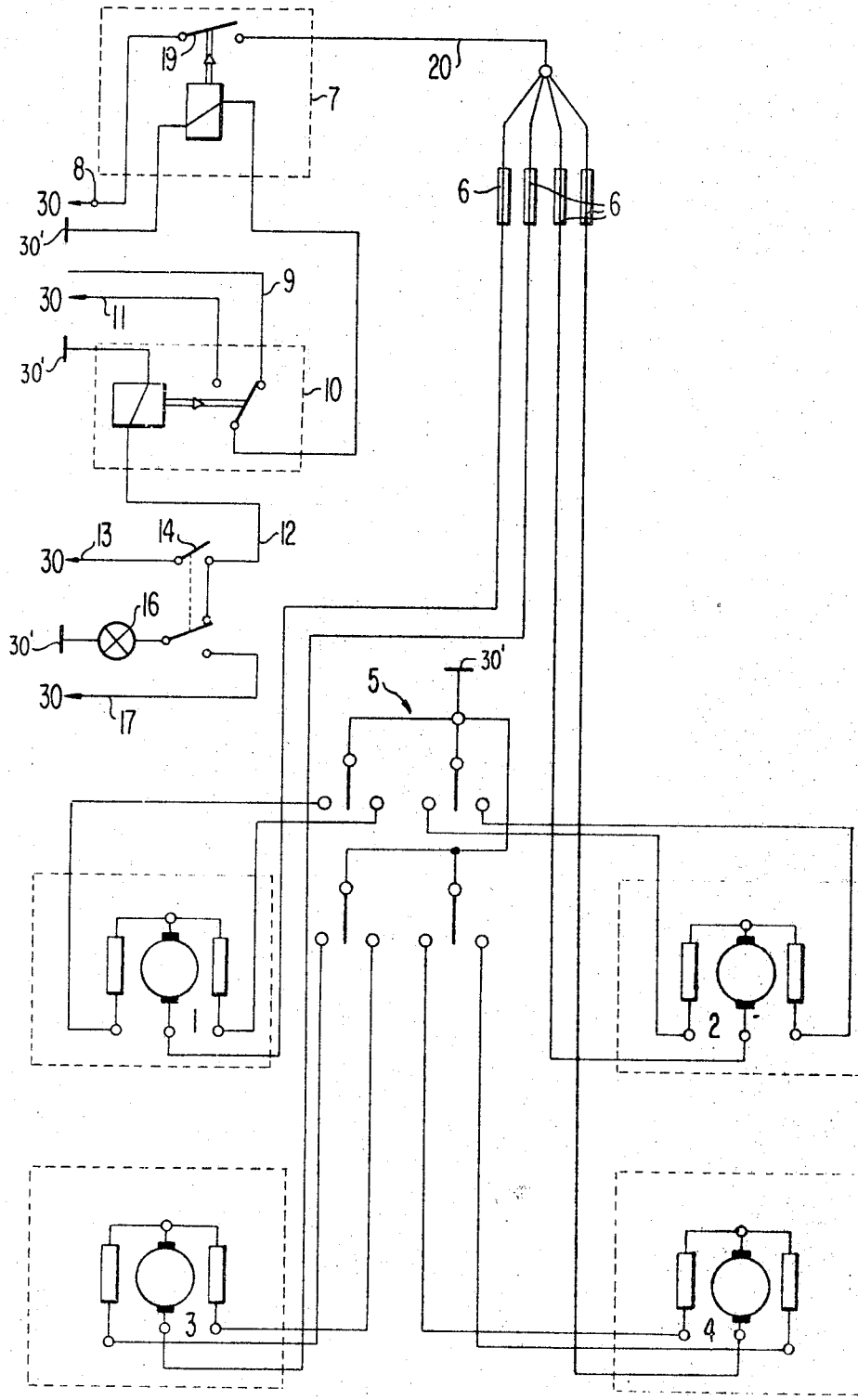

ELECTRIC INSTALLATION FOR THE ACTUATING SWITCHES OF ELECTRICALLY OPERATED WINDOWS IN MOTOR VEHICLES

BACKGROUND OF THE INVENTION

The present invention relates to a current supply installation for the actuating switches of electrically operated window lifts in motor vehicles, in which the actuating switches can be selectively connected with the voltage supply either by way of the ignition switch or by way of an auxiliary switch.

With the known installations of this type, the auxiliary switch is actuatable manually. The possibility then exists, after one has left the vehicle and has found that a window is still open, to close this window without the need for a renewed insertion and actuation of the ignition key; however, one has to actuate for that purpose two switches; namely, with the one hand, the auxiliary switch and with the other, the window-actuating switch, properly speaking. Furthermore, these prior art installations—quite apart from the installation of an additional switch—entail a further significant disadvantage: An experienced burglar can operate both switches by the introduction of two hooks or rods through the window sealing rubber.

SUMMARY OF THE INVENTION

These disadvantages are to be avoided by the present invention. It is proposed in connection with the present invention that a door contact switch—present almost always already as switch for the interior lighting—serves as auxiliary switch. It is then necessary with an open door to actuate only the actuating switch, properly speaking, thus obviating the need for an additional switch as auxiliary switch, and with a closed door burglars cannot reach the door contact switch without a forcible, destructive action.

Accordingly, it is an object of the present invention to provide an electric supply installation for the actuating switches of electrically operated windows in motor vehicles which avoids by extremely simple means the aforementioned shortcomings and drawbacks encountered in the prior art.

Another object of the present invention resides in a current supply installation for the actuating switches of electrically operated windows of motor vehicles which permits the operation of the windows under certain conditions without the need for actuating the ignition switch.

A further object of the present invention resides in a current supply installation for the actuating switches of electrically operated motor vehicle windows which is simple in construction, minimizes the number of necessary parts and facilitates operation thereof.

Still another object of the present invention resides in an electric system for electrically operated motor vehicle windows which permits operation of the windows even without the turning-on of the ignition-key yet prevents actuation of these windows when the doors are closed unless the ignition key is turned-on.

A further object of the present invention resides in a current supply installation for the actuating switches of electrically operated motor vehicle windows which entails greater safety against burglary than the prior art system, yet is simple in construction and relatively inexpensive in manufacture and assembly.

These and further objects, features, and advantages of the present invention will become more obvious form the following description when taken in connection with the accompanying drawing which shows, for purposes of illustration only, one embodiment in accordance with the present invention, and wherein:

The single FIG. is a schematic wiring diagram of a current supply installation for the actuating switches of electrically operated window lifts of motor vehicles in accordance with the present invention.

Referring now to the single FIG. of the drawing, reference numerals 1 to 4 designate therein four window lift drives of any conventional construction, for example, in the form of suitable electric motors. The actuating switches for the four window lift drives 1 to 4 of a motor vehicle are combined conventionally at a common place generally designated by reference numeral 5, as is customary, for example, within the area of the driver seat. The current supply for each of the actuating motors 1 to 4 takes place, upon closure of the respective switch 5, by way of a respective fuse or the like 6, a common line 20 and a common relay 7 which is connected with the vehicle battery by way of a line 8.

The winding of the common relay 7 is operatively connected by way of a switching relay 10 either with the ignition switch current circuit (line 9) or directly with the battery (line 11).

The winding of the auxiliary relay 10 can be supplied with current by way of a line 13, a door contact switch 14, and a line 12.

The door contact switch 14 simultaneously actuates a vehicle interior light 16, and more particularly in such a manner that with an open door the light 16 is supplied with current by way of a voltage supply connection 17, connected conventionally with the battery.

OPERATION

In the illustrated position, the respective vehicle door of the motor vehicle is closed while the ignition has not yet been turned on. Upon turning on of the ignition, the current coming from the ignition switch (not shown) reaches by way of line 9 the energizing coil of the common relay 7 which attracts its armature upon current energization and applies voltage to the switches 5. Thus, with a closed door, the windows can only be opened or closed with a turned-on ignition key switch.

With an opened door, the contacts of the switch 14 are automatically closed in a conventional manner whereby the interior light 16 is turned on and the switching relay 10 is energized, thereby attracting its armature. As a result thereof, the winding of the common relay 7 is supplied with current by way of the line 11 and the switch 19 closes as a result thereof: The actuating switches 5 are therefore ready for operation without the need of turning on the ignition. For the sake of clarity, all connections with one side of the battery are indicated by reference numeral 30, while the connections with the other side of the battery are indicated by reference numeral 30'.

While I have shown and described only one embodiment in accordance with the present invention, it is understood that the same is not limited thereto but is susceptible of numerous changes and modifications as known to a person skilled in the art. Thus, it is also recommended in accordance with the present invention to superimpose the indicated functions on the window actuating switches of each passenger door by corresponding lines and control relays and switches. This can be readily done by providing a similar interconnection with the corresponding door-operated switch 14 for each window actuating switch of the respective door, following the same connection as indicated for the switch arrangement 5. Additionally, the various electrical elements, indicated only schematically, can be replaced by electrical equivalents within the scope of the present invention.

Thus, it is obvious that the present invention is not limited to the details shown and described herein but is susceptible of numerous changes and modifications within the spirit and scope thereof, and I therefore do not wish to be limited to the details illustrated and described, but intend to cover all such changes and modifications as are encompassed by the scope of the appended claims.

I claim:

1. A current supply system for providing driving current to the actuating switches of electrically driven window lifts in motor vehicles having a pair of switches for supplying ignition current and an auxiliary current respectively, in which voltage is selectively applied from a source over circuit means for supplying actuating current through one of said switches of said pair, wherein said auxiliary current supplying switch comprises door contact switch means operated by opening and closing of a vehicle door.

2. A current supply system according to claim 1, further comprising switching relay means, and means operatively connecting said switching relay means with said door contact switch means in such a manner that with a closed door the corresponding actuating switch is operatively connected with the ignition current circuit and with an open door is directly connected with the current source.

3. A current supply system according to claim 2, further comprising common control relay means for all actuating switches, and connecting means operatively connecting said switching relay means with said common control relay means to apply voltage to the actuating switches upon opening of a respective door or upon closure of the ignition switch.

4. A current supply system for providing driving current to the actuating switches of electrically driven window lifts in motor vehicles having a pair of switches for supplying ignition current and an auxiliary current respectively, comprising actuating switch means for actuating a respective window lift, current supply means, and means selectively connecting said actuating switch means with said current supply means through one of said switches of said pair, said auxiliary current supplying switch being automatically operated by opening and closing of the respective door.

5. A current supply system according to claim 4, wherein said switch for supplying auxiliary current is a door switch means which operatively connects the current supply means with the actuating switch means upon opening of the door.

6. A current supply system according to claim 5, further comprising relay means normally energized upon the closing of the switch for supplying ignition current for connecting said current supply means with said actuating switch means, and further relay means energized by closing of said switch for supplying auxiliary current for energizing the winding of said first relay means from said current supply means in bypassing relationship to the switch for supplying ignition current.

7. A current supply system according to claim 4, further comprising relay means normally energized upon the closing of the switch for supplying ignition current for connecting said current supply means with said actuating switch means, and further relay means energized by closing of said switch for supplying auxiliary current for energizing the winding of said first relay means from said current supply means in bypassing relationship to the switch for supplying ignition current.

8. A current supply system according to claim 4, further comprising relay means normally energized upon the supplying of the ignition current for connecting said current supply means with said actuating switch means, and further relay means energized by closing of said switch for supplying said auxiliary current for energizing the actuating switch means from said current supply means.